(12) United States Patent
Sumikawa (10) Patent No.: US 10,780,788 B2
(45) Date of Patent: Sep. 22, 2020

(54) HIGH VOLTAGE COMPONENT ASSEMBLY AND POWER SUPPLY SYSTEM FOR VEHICLE

(71) Applicant: TOYOTA JIDOSHA KABUSHIKI KAISHA, Toyota-shi, Aichi-ken (JP)

(72) Inventor: Hiroki Sumikawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 269 days.

(21) Appl. No.: 15/914,177

(22) Filed: Mar. 7, 2018

(65) Prior Publication Data

US 2018/0257510 A1 Sep. 13, 2018

(30) Foreign Application Priority Data

Mar. 9, 2017 (JP) ................. 2017-044793

(51) Int. Cl.
*B60L 15/00* (2006.01)
*B60R 16/033* (2006.01)
(Continued)

(52) U.S. Cl.
CPC ............. *B60L 15/007* (2013.01); *B60L 58/33* (2019.02); *B60L 58/40* (2019.02); *H01H 47/00* (2013.01);
(Continued)

(58) Field of Classification Search
CPC ..... B60L 58/30; H01M 2/20; H01M 8/04298; H01M 10/42; H01R 24/00; H01R 2201/26
See application file for complete search history.

(56) References Cited

U.S. PATENT DOCUMENTS

2009/0073624 A1 3/2009 Scholer et al.
2013/0148251 A1* 6/2013 Iwashita ................. B60L 53/60
361/170

FOREIGN PATENT DOCUMENTS

JP 2009-077627 A 4/2009
JP 2011-244580 A 12/2011
(Continued)

OTHER PUBLICATIONS

Trnaslation of JP 2011244580-A (Year: 2011).*

*Primary Examiner* — Rexford N Barnie
*Assistant Examiner* — Elim Ortiz
(74) *Attorney, Agent, or Firm* — Finnegan, Henderson, Farabow, Garrett & Dunner, LLP (57) ABSTRACT

The high voltage component assembly includes a first high voltage component and a second high voltage component for operating respectively upon reception of high voltage supply from a supply source, a case body for containing the first high voltage component therein, a lid to be attached to the case body to prevent access to an inside of the case body in a state of the lid being attached to the case body, a fastening member to be fastened in a fastening state to fix the lid so as not to be detached from the case body, a receptacle to which the second high voltage component is attached, the receptacle being provided at a position precluding release of the fastening member from the fastening state in a state of the receptacle receiving the second high voltage component attached, and a cutoff device for cutting off the supply of the high voltage from the supply source upon detachment of the second high voltage component from the receptacle.

5 Claims, 11 Drawing Sheets (51) Int. Cl.
  *H01H 47/00* (2006.01)
  *B60L 58/33* (2019.01)
  *B60L 58/40* (2019.01)

(52) U.S. Cl.
  CPC ........ *B60L 2210/10* (2013.01); *Y02T 10/7005* (2013.01); *Y02T 90/121* (2013.01)

(56) References Cited

FOREIGN PATENT DOCUMENTS

| JP | 2011244580 A | * | 12/2011 |
| JP | 2013-138570 A | | 7/2013 |

* cited by examiner

Fig.2

SIDE VIEW

SECOND EMBODIMENT
SIDE VIEW

HIGH VOLTAGE COMPONENT ASSEMBLY AND POWER SUPPLY SYSTEM FOR VEHICLE

CROSS-REFERENCE OF RELATED APPLICATIONS

This application claims priority based on Japanese Application No. 2017-044793 filed on Mar. 9, 2017, and the disclosure thereof is incorporated herein by reference in its entirety.

BACKGROUND

Field

The present disclosure relates to a high voltage component assembly and a power supply system for vehicle.

Related Art

A mechanism called interlock is incorporated in a high voltage device to which high voltage is supplied, so as to surely cut off the supply of high voltage when access to the inside of the device is required for maintenance or the like. For example, Japanese Patent Publication No. JP2013-138570A discloses that a connector for interlocking is prepared and attached to a high voltage device. When this connector for interlocking is detached from the high voltage device, the supply of high voltage is stopped. The connector for interlocking disclosed in JP2013-138570A has a bracket that is overhanging. The connector for interlocking is configured so that, when the connector for interlocking is attached to the high voltage device, the bracket of the connector for interlocking covers a bolt fastening the cover of the high voltage device to a case body.

Accordingly, in the structure disclosed in JP2013-138570A, the cover of the case body cannot be opened unless the connector for interlocking is detached. However, in the case of being applied to a high voltage component assembly including a large number of high voltage components, the structure requires an interlock mechanism for each of the plurality of high voltage components, and thus the number of components may possibly increase.

SUMMARY

According to one aspect of the present disclosure, a high voltage component assembly is provided. The high voltage component assembly includes a first high voltage component and a second high voltage component for operating respectively upon reception of high voltage from a supply source, a case body for containing the first high voltage component therein, a lid to be attached to the case body to prevent access to an inside of the case body in a state of the lid being attached to the case body, a fastening member to be fastened in a fastening state to fix the lid so as not to be detached from the case body, a receptacle to which the second high voltage component is attached, the receptacle being provided at a position precluding release of the fastening member from the fastening state in a state of the receptacle receiving the second high voltage component attached, and a cutoff device for cutting off the supply of the high voltage from the supply source upon detachment of the second high voltage component from the receptacle.

In order that the first high voltage component is detached, the second high voltage component is detached from the receptacle, and then the fastening member of the case body is detached and the lid is opened. According to the present aspect, the lid of the case body cannot be opened unless the second high voltage component is detached from the receptacle. In order that the lid is opened, the second high voltage component is necessarily detached from the receptacle. When the second high voltage component is detached from the receptacle, the cutoff device cuts off the supply of the high voltage from the supply source, and thus high voltage is no longer supplied to the high voltage component assembly. As a result, there is no need to provide an interlock mechanism in the first high voltage component. That is, the number of components is enabled to be reduced compared to the case where an interlock mechanism is additionally provided to the first high voltage component.

DESCRIPTION OF EMBODIMENTS

First Embodiment

As an embodiment, a high voltage component assembly including two high voltage components is described. The high voltage component assembly is used as, for example, a power supply system for vehicle. A first high voltage component in the two high voltage components is an inverter included in a first high voltage module 20, and a second high voltage component is a second high voltage module 150 for supplying high voltage to the first high voltage module 20. Specifically, the second high voltage module 150 has a high voltage wiring for supplying high voltage and a connector 155 provided at the distal end portion of the high voltage wiring. The wiring and the connector 155 are collectively referred to as "second high voltage module 150". The connector 155 of the second high voltage module 150 is connected to a receptacle 255 provided on the first high voltage module 20. These configurations and the like will be described in detail later. First, the entire configuration of a power supply system for vehicle 10 having the first high voltage module 20 and the second high voltage module 150 is described. It is noted that high voltage used in a vehicle is assumed to be the high voltage (60V or more) based on Japanese laws and regulations, but voltage higher than the voltage defined in other standards or laws and regulations of a country of filling may be set as high voltage.

Figure 1:
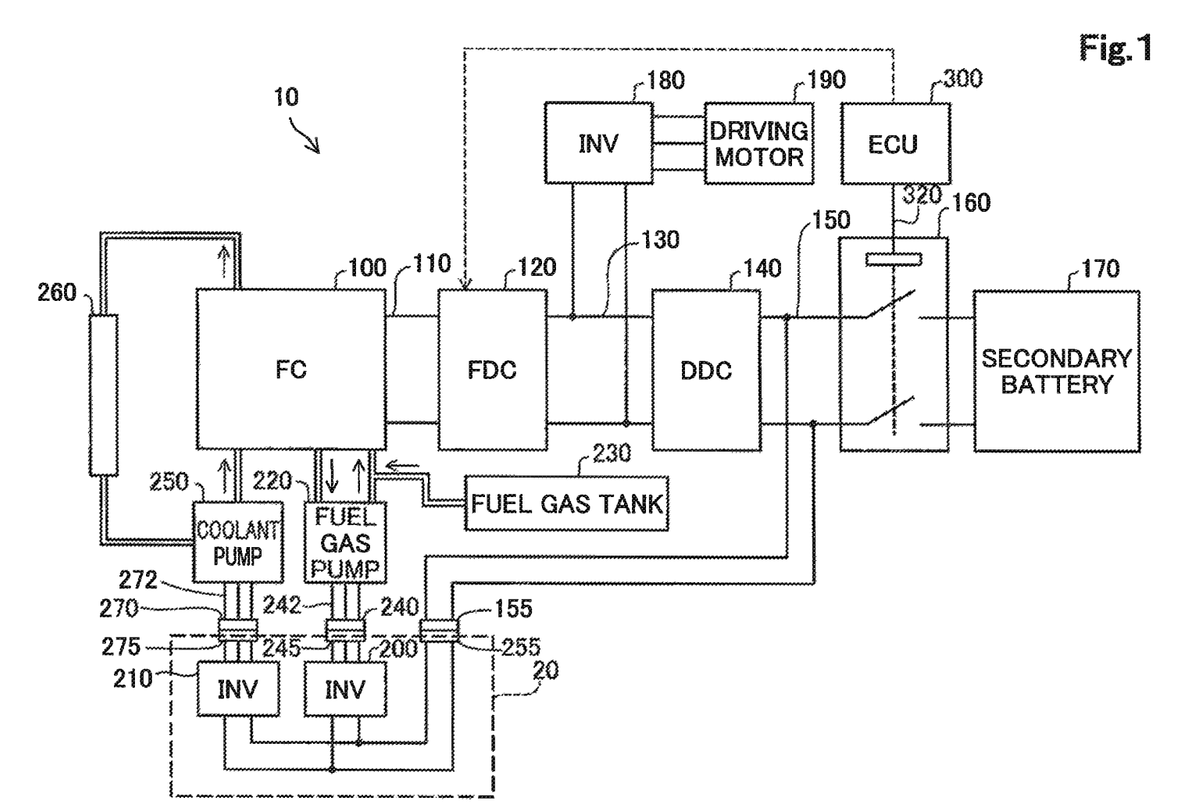
FIG. 1 is an explanatory diagram illustrating a schematic configuration of a power supply system circuit of a power supply system for vehicle.

FIG. 1 is an explanatory diagram illustrating a schematic configuration of a power supply system circuit of the power supply system for vehicle 10. The power supply system for vehicle 10 includes a fuel cell 100, a fuel cell converter 120 (abbreviated as "FC converter 120" in the specification and indicated as "FDC" in the figure), a DC-DC converter 140 (indicated as "DDC" in the figure), a system main relay 160 (abbreviated as "relay 160"), a secondary battery 170, an inverter for driving motor 180, a driving motor 190, the first high voltage module 20, the second high voltage module 150, a fuel gas tank 230, a fuel gas pump 220, a coolant pump 250, a radiator 260, and a control unit 300 (also referred to as "ECU 300"). Although the power supply system for vehicle 10 has an oxidant gas system, the illustration and the description thereof are omitted.

The fuel cell 100 and the FC converter 120 are connected therebetween by a first high voltage wiring 110. The FC converter 120 and the DC-DC converter 140 are connected therebetween by a second high voltage wiring 130. The DC-DC converter 140 and the secondary battery 170 are connected therebetween by the second high voltage module 150 having a high voltage wiring. The high voltage wiring of the second high voltage module 150 has the relay 160 provided with a contact. The relay 160 is connected to the control unit 300 by a relay control line 320. The second high voltage wiring 130 is connected to the inverter for driving motor 180, and an output of the inverter for driving motor 180 is connected to the driving motor 190. The inverter for driving motor 180 converts direct current into three-phase alternating current and supplies the three-phase alternating current to the driving motor 190. The driving motor 190 drives a driving wheel (not shown) of a vehicle equipped with the power supply system for vehicle 10.

The fuel cell 100 is a power generator for generating DC power by reacting fuel gas with oxidant gas. The fuel cell 100 receives the fuel gas supplied from the fuel gas tank 230. It is noted that, since the fuel exhaust gas discharged by the fuel cell 100 contains unreacted fuel gas, the fuel gas supplied from the fuel gas tank 230 and the fuel exhaust gas circulated through the fuel gas pump 220 may be mixed and supplied to the fuel cell 100.

The FC converter 120 is a DC-DC converter for stepping up the voltage of DC power output by the fuel cell 100 to the voltage suitable for driving the driving motor 190. The FC converter 120 has a relay inside (not shown). When the relay 160 is opened (also referred to as being "in an off state"), the control unit 300 also turns off the relay in the FC converter 120 so as to electrically disconnect between the first high voltage wiring 110 and the second high voltage wiring 130.

The DC-DC converter 140 is a bidirectional DC-DC converter. In an example, the DC-DC converter 140 steps up the voltage of the secondary battery 170 to the voltage suitable for driving the driving motor 190, so as to supply the stepped-up voltage to the driving motor 190. The DC-DC converter 140 also steps down the voltage of the regenerative electric power generated by the driving motor 190, or the voltage of DC power stepped up by the FC converter 120 after being generated by the fuel cell 100, to the voltage of the secondary battery 170 so as to charge the secondary battery 170. The secondary battery 170 is configured with, for example, a nickel hydrogen battery, a lithium ion battery or the like. The relay 160 is an electromagnetic switch for cutting off the power transmission between the secondary battery 170 and the DC-DC converter 140 and cutting off the power supply from the secondary battery 170 to the first high voltage module 20. The high voltage wiring of the second high voltage module 150 branches at a position closer to the DC-DC converter 140 than to the relay 160. The connector 155 is provided at the distal end portion of the branching wiring. The connector 155 is to be connected to the receptacle 255 of the first high voltage module 20.

The first high voltage module 20 includes an inverter for fuel gas pump 200, an inverter for coolant pump 210, and three receptacles of the receptacle 255, a receptacle 245 and a receptacle 275. The inverter for fuel gas pump 200 and the inverter for coolant pump 210 are each connected to the receptacle 255 by a wiring inside the first high voltage module 20. The inverter for fuel gas pump 200 is also connected to the receptacle 245 by a wiring inside the first high voltage module 20. The inverter for coolant pump 210 is connected to the receptacle 275 by a wiring inside the first high voltage module 20. The first high voltage module 20 receives power supply via the receptacle 255, converts the power into AC power by the inverter for fuel gas pump 200 and the inverter for coolant pump 210, and outputs the AC power respectively to the fuel gas pump 220 and the coolant pump 250 via the receptacles 245 and 275.

The receptacle 245 is connected to the fuel gas pump 220 via a connector 240 and a wiring for fuel gas pump driving 242. The inverter for fuel gas pump 200 is an inverter for driving the fuel gas pump 220. The fuel exhaust gas discharged by the fuel cell 100 contains unreacted fuel gas in general. The fuel gas pump 220 circulates the fuel exhaust gas discharged by the fuel cell 100 to a fuel gas supply pipe.

The receptacle 275 is connected to the coolant pump 250 via a connector 270 and a wiring for coolant pump driving 272. The inverter for coolant pump 210 is an inverter for driving the coolant pump 250. The coolant pump 250 circulates coolant between the fuel cell 100 and the radiator 260 by sending the coolant discharged by the fuel cell 100 to the radiator 260 and supplying the coolant cooled in the radiator 260 to the fuel cell 100.

The control unit 300 entirely controls the power supply system for vehicle 10. The control unit 300 controls turning-on/-off of the relay 160. In the first embodiment (and also in other embodiments), a power source different from the fuel cell 100 and the secondary battery 170, for example, a lead battery (not shown) is used as a power source of the control unit 300. Accordingly, even when the relay 160 is in an off state, power is supplied to the control unit 300 so that the control unit 300 is enabled to control the power supply system for vehicle 10.

Figure 2:
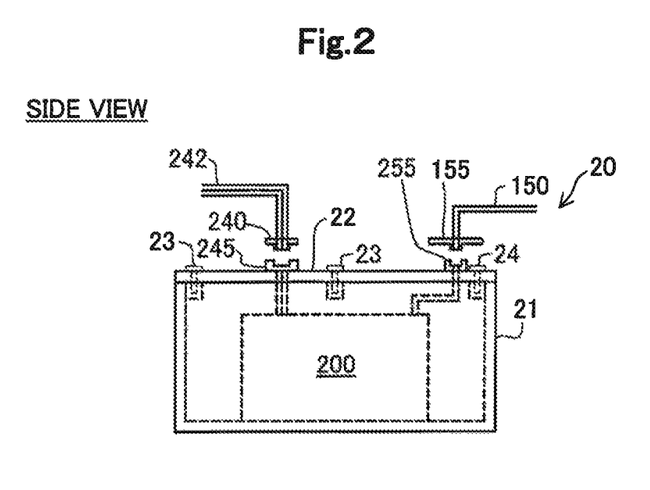
FIG. 2 is a side view of a first high voltage module.
Figure 3:
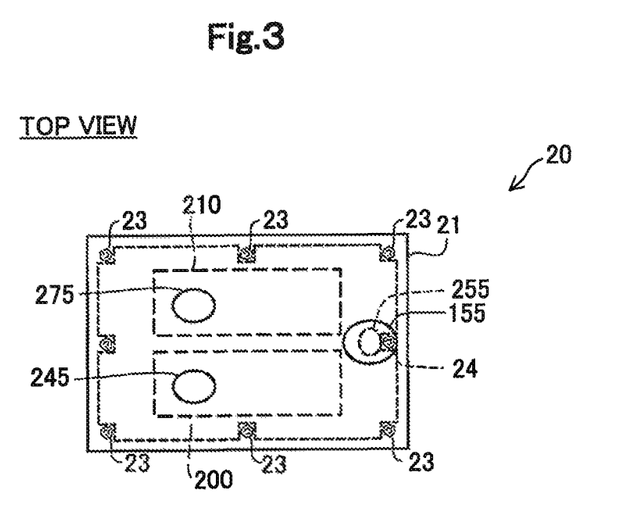
FIG. 3 is a top view of the first high voltage module.

FIG. 2 is a side view of the first high voltage module 20. FIG. 3 is a top view of the first high voltage module 20. The members indicated with broken lines in FIG. 2 and FIG. 3 are directly invisible members which are hidden by other members. The first high voltage module 20 is configured to include the inverter for fuel gas pump 200, the inverter for coolant pump 210, and receptacles 255, 245 and 275 in a container composed of a case body 21 and a lid 22. The case body 21 is a hollow rectangular parallelepiped container which contains the inverter for fuel gas pump 200 and the inverter for coolant pump 210, and has one surface thereof opened. The lid 22 is a member in a substantially rectangular plate shape to be attached to the opened surface of the case body 21. The lid 22 is fixed with a bolt 23 and a bolt 24 each to the case body 21 at an outer edge portion of the case body 21 so as not to be detached from the case body 21. In a state where the lid 22 is fixed to the case body 21, access to the inside of the case body 21 is hindered. It is noted that, although the bolt 23 and the bolt 24 are the same in that they are fastening members to be fastened in a fastening state so as to fix the lid 22 to the case body 21, they are provided in different circumstances, and thus different reference numbers are assigned for distinction. The bolt 23 is provided at a position where the bolt 23 is detachable even in the state where the connector 155 is connected to the receptacle 255. Contrarily, the bolt 24 is provided at a position where the bolt 24 is not detachable to release a fastening state in a state where the connector 155 is connected to the receptacle 255.

As described above, the second high voltage module 150 has the connector 155 at the end potion of the branching high voltage wiring. The connector 155 has a flange which overhangs toward an outer edge direction of the case body 21 from the receptacle 255 so as to hide the bolt 24 in the state where the connector 155 is inserted into the receptacle 255. Therefore, when the connector 155 is connected to the receptacle 255, the bolt 24 attached to the outer edge portion of the lid 22 is hidden by the connector 155. The specific configuration of the flange will be described later. Accordingly, in the state where the connector 155 is connected to the receptacle 255, the bolt 24 is not detachable, and thus the lid 22 is not detachable. On the other hand, when the connector 155 is detached from the receptacle 255, the bolt 24 becomes detachable and thus the lid 22 becomes detachable.

Figure 4:
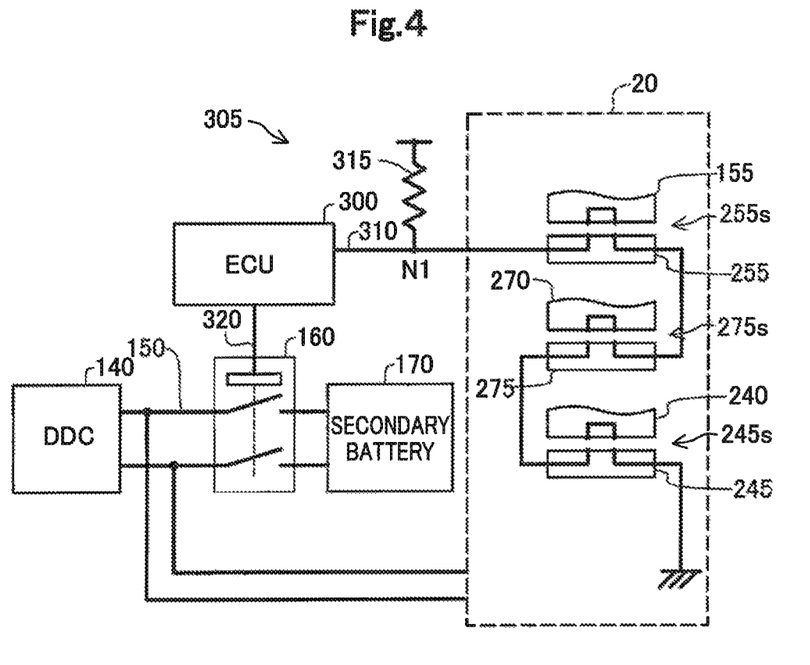
FIG. 4 is an explanatory view illustrating a schematic configuration of a cutoff device.

FIG. 4 is an explanatory diagram illustrating a schematic configuration of a cutoff device 305 used in the present embodiment. The cutoff device 305 includes a first control line 310, the relay control line 320, and three switches of a switch 255s, a switch 245s, and a switch 275s. The first control line 310 has a pull-up resistor 315 between a node N1 and a power supply, and has the three switches 255s, 245s and 275s connected in series between the node N1 and the ground. It is note that any order of the three switches 255s, 245s and 275s is available. The node N1 is connected to the control unit 300. It is noted that the cutoff device 305 may be configured with a pull-down resistor for connection to the ground instead of the pull-up resistor 315. In this case, the first control line 310 has the three switches 255s, 245s and 275s connected in series between a power supply and the node N1.

Assuming that there is no voltage stepped down by the switches 255s, 245s and 275s (on-resistance is substantially zero), when all of the three switches 255s, 245s and 275s are turned on and become each in a conduction, state, the potential of the node N1 substantially becomes the ground potential. On the other hand, when any one of the three switches 255s, 245s, 275s is turned off and becomes in a non-conduction state, no current flows through the pull-up resistor 315 and thus there is no voltage stepped down by the pull-up resistor 315. Accordingly, the potential of the node N1 substantially becomes a power supply potential. By acquiring the potential of the node N1, the control unit 300 is capable of determining whether all of the three switches 255s, 245s and 275s are each in an on state or whether any one of the three switches 255s, 245s and 275s is in an off state. Next, the on/off state of the switch 255s is described in relation to the structure of the connector 155 and the receptacle 255.

Figure 5:
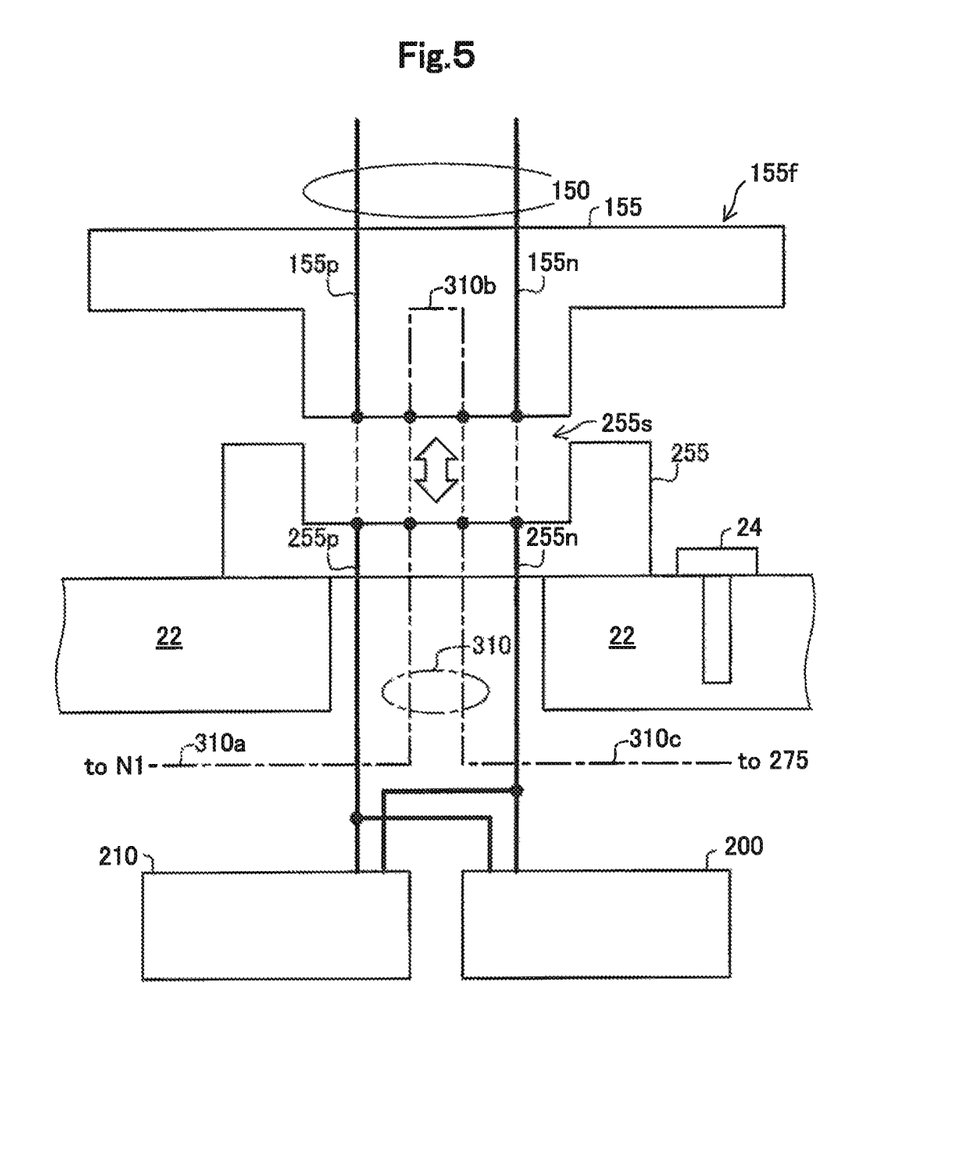
FIG. 5 is an explanatory view illustrating configurations of a connector and a receptacle.

FIG. 5 is an explanatory view illustrating configurations of the connector 155 and the receptacle 255. The connector 155 is provided at the end portion of the branching wiring of the second high voltage module 150. The connector 155 has a flange 155f to hide the bolt 24. The flange 155f has a size and a shape allowing hiding of the bolt 24 provided in the vicinity of the receptacle 255 in the case where the connector 155 is inserted into the receptacle 255.

The connector 155 contains a plus-side third high voltage wiring 155p, a minus-side third high voltage wiring 155n, and a partial control line 310b. The receptacle 255 includes a plus-side wiring 255p, a minus-side wiring 255n, and a partial control line 310a and a partial control line 310c of the first control line 310. The partial control line 310a is connected to the node N1, and the partial control line 310c is connected to the receptacle 275. In the state where the connector 155 is not inserted, the partial control line 310a and the partial control line 310c are not conducted with each other. The wirings 255p and 255n are respectively connected to the inverter for fuel gas pump 200 and the inverter for coolant pump 210.

When the connector 155 is inserted into the receptacle 255, the partial control line 310a and the partial control line 310c are conducted with each other via the partial control line 310b. When the connector 155 is detached from the receptacle 255, the partial control line 310a and the partial control line 310c become nonconductive. Depending on whether the connector 155 is inserted into the receptacle 255 or the connector 155 is detached from the receptacle 255, the state thereof is switched between conduction and non-conduction. That is, insertion and non-insertion of the connector 155 function as the switch 255s. Likewise, the receptacles 245 and 275 respectively function as the switches 245s, 275s depending on whether the connectors 240, 270 are inserted or detached, respectively (see FIG. 4).

When the potential of the node N1 in FIG. 4 is lower than a predetermined potential, the control unit 300 determines that all of the switches 255s, 245s and 275s are each in an on state, that is, that the connectors 155, 240, 270 are respectively inserted into the receptacles 255, 245 and 275, and thus turns on the relay 160. When the potential of the node N1 is higher than a predetermined potential, the control unit 300 determines that any one of the switches 255s, 245s and 275s is in an off state, that is, that any one of the connectors 155, 240, 270 is detached from corresponding one of the receptacles 255, 245, 275, and turns off the relay 160. As a result, power supply from the secondary battery 170 to the first high voltage module 20 is stopped. When turning off the relay 160, the control unit 300 also turns off the relay provided in the FC converter 120 as described above. Accordingly, power supply from the fuel cell 100 to the first high voltage module 20 is also stopped.

When an operator intends to access the inverter for fuel gas pump 200 or the inverter for coolant pump 210, at least the connector 155 is detached from the receptacle 255. In the first embodiment, an operator is enabled to remove the bolt 24 only after detaching the connector 155. Thereafter, the operator detaches the bolts 23 and 24 and opens the lid 22. In the first embodiment, when at least the connector 155 in the three connectors 155, 240, 270 is detached, the switch 255s is turned off, and the node N1 is set to high potential (power supply potential). When the potential of the node N1 becomes high potential, the control unit 300 turns off the relay 160. As a result, power supply to the first high voltage module 20 is stopped and the inverter for fuel gas pump 200 and the inverter for coolant pump 210 is stopped.

As described above, according to the first embodiment, the lid 22 of the case body 21 is not opened unless the connector 155 of the second high voltage module 150 which is the second high voltage component is detached. In order that the lid 22 is opened, the connector 155 of the second high voltage module 150 which is the second high voltage component is necessarily detached from the lid 22. At this time, since the relay 160 is turned off by the cutoff device 305 and the supply of high voltage from a supply source is cut off, high voltage is no longer supplied to the first high voltage module 20 containing the inverter for fuel gas pump 200 which is the first high voltage component. As a result, there is no need to additionally provide an interlock mechanism to the inverter for fuel gas pump 200 which is the first high voltage component. That is, the number of components is enabled to be reduced compared to the case where an interlock mechanism is additionally provided to the inverter for fuel gas pump 200 which is the first high voltage component.

In the first embodiment, the connector 155 hides the bolt 24. However, the connector 240 or the connector 270 may be configured to hide the bolt 24. When the connector 240 or the connector 270 is detached, the relay 160 is turned off, and power supply to the first high voltage module 20 is stopped. It is noted that, in this case, the connector 240 or the connector 270 corresponds to the second high voltage component.

Second Embodiment

Figure 6:
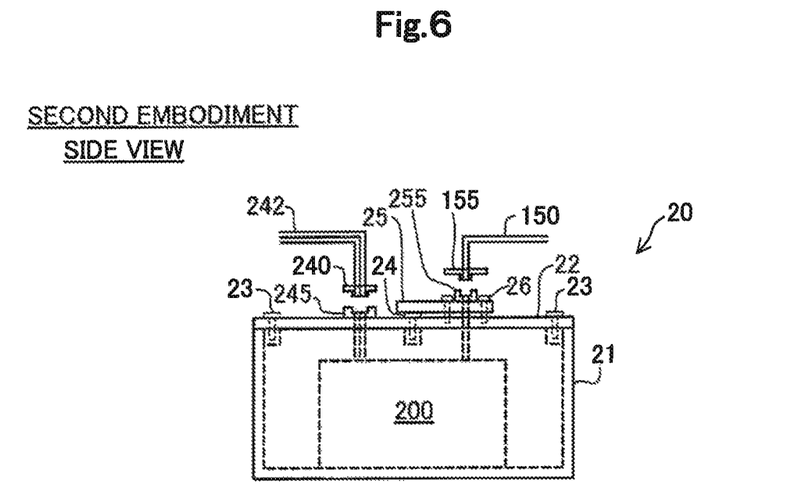
FIG. 6 is a side view of a first high voltage module according to a second embodiment.
Figure 7:
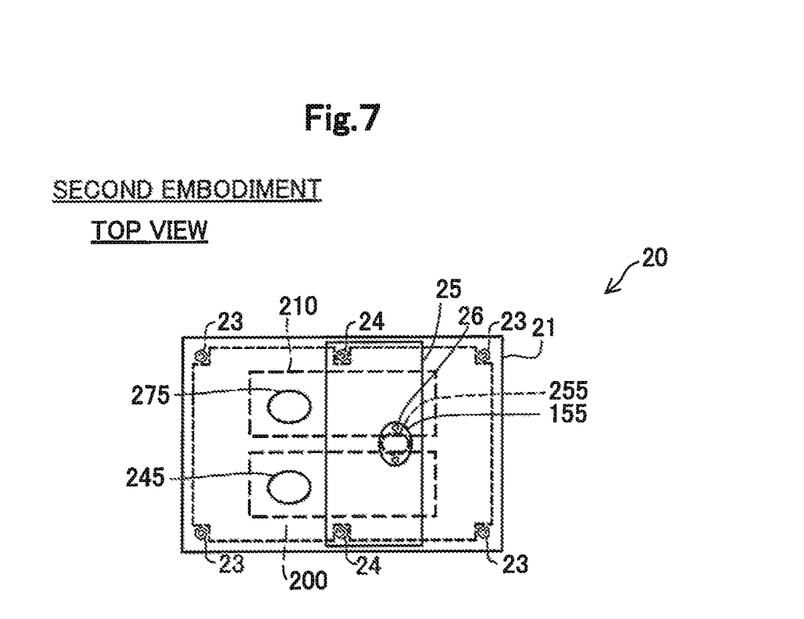
FIG. 7 is a top view of the first high voltage module according to a second embodiment.

FIG. 6 is a side view of the first high voltage module 20 according to a second embodiment. FIG. 7 is a top view of the first high voltage module 20 according to a second embodiment. The difference from the first embodiment shown in FIG. 2 and FIG. 3 is that the receptacle 255 is provided on a substrate 25 different from the lid 22, and that the substrate 25 hides the bolt 24. It is noted that the substrate 25 is fixed to the lid 22 with a bolt 26, and the bolt 26 is provided at a position where the bolt 26 is detachable only after the connector 155 is detached from the receptacle 255.

In the second embodiment, the bolt 24 is detached and the lid 22 is detached, only after the connector 155 is detached, the bolt 26 is detached, and the substrate 25 is detached. Thereafter, access to the inside of the case body 21 is available. Also in the second embodiment, when any one of the connectors 155, 240 and 270 is detached from the corresponding one of the receptacles 255, 245 and 275 as in the first embodiment, the relay 160 is turned off and power supply to the first high voltage module 20 is stopped.

As described above, according to the second embodiment, the substrate 25 is not detachable unless the connector 155 of the second high voltage module 150 which is the second high voltage component is detached from the receptacle 255. Further, the lid 22 is not detachable unless the substrate 25 is detached. Conversely, in order that the lid 22 is opened, the connector 155 of the second high voltage module 150 which is the second high voltage component is necessarily detached from the receptacle 255. At this time, since the relay 160 is turned off and the supply of high voltage from a supply source is cut off, high voltage is no longer supplied to the inverter for fuel gas pump 200 which is the first high voltage component. As a result, as in the first embodiment, there is no need to additionally provide an interlock mechanism to the inverter for fuel gas pump 200 which is the first high voltage component. That is, the number of components is enabled to be reduced compared to the case where an interlock mechanism is additionally provided to the inverter for fuel gas pump 200 which is the first high voltage component.

The bolt 24 is attached on outer edge portions of the case body 21 and the lid 22. In the first embodiment, since the flange 155f of the connector 155 is configured to hide the bolt 24, the receptacle 255 is provided at a position close to the attachment position of the bolt 24 on the lid 22, that is, in a vicinity of the outer edge of the lid 22. In the second embodiment, since the substrate 25 can hide the bolt 24, the receptacle 255 has no limitation in attachment position.

In the second embodiment, the receptacle 255 is configured to be attached on the substrate 25. However, the receptacles 245, 275 may be provided on the substrate 25, and at least one of the connectors 240, 270 may be configured to hide the bolt 26.

Third Embodiment

Figure 8:
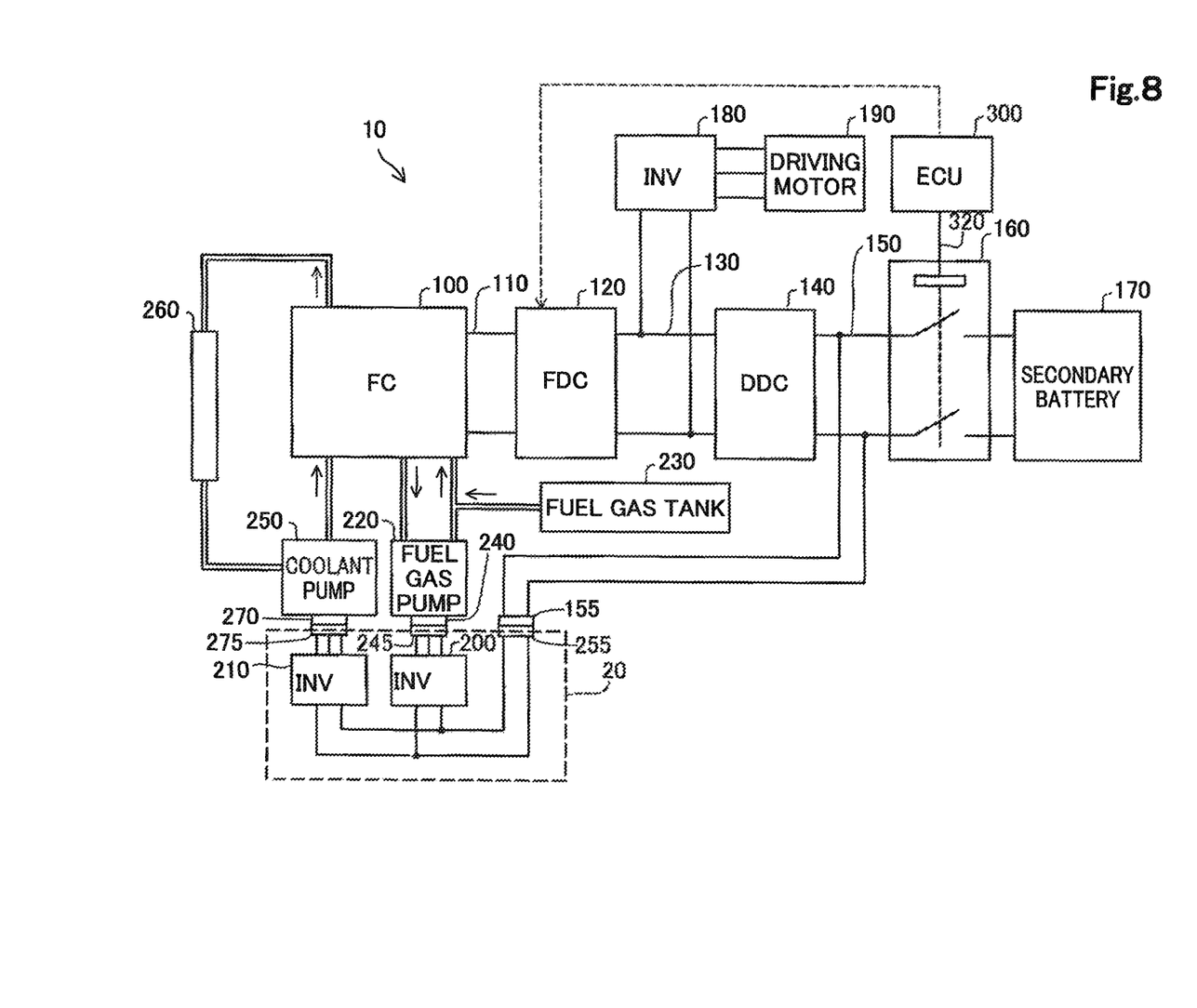
FIG. 8 is an explanatory diagram illustrating a schematic configuration of a power supply system circuit of a power supply system for vehicle according to a third embodiment.

FIG. 8 is an explanatory diagram illustrating a schematic configuration of a power supply system circuit of the power supply system for vehicle 10 according to a third embodiment. The difference from the power supply system for vehicle 10 according to the first embodiment is the arrangement with respect to the fuel gas pump 220, the coolant pump 250, and the first high voltage module 20. The third embodiment is different compared to the first embodiment in that the wiring for fuel gas pump driving 242 or the wiring for coolant pump driving 272 is not provided.

Figure 9:
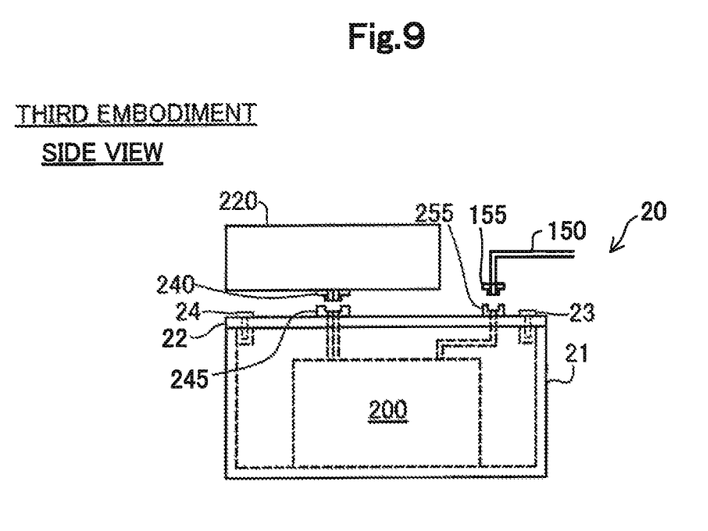
FIG. 9 is a front view of a first high voltage module according to the third embodiment.
Figure 10:
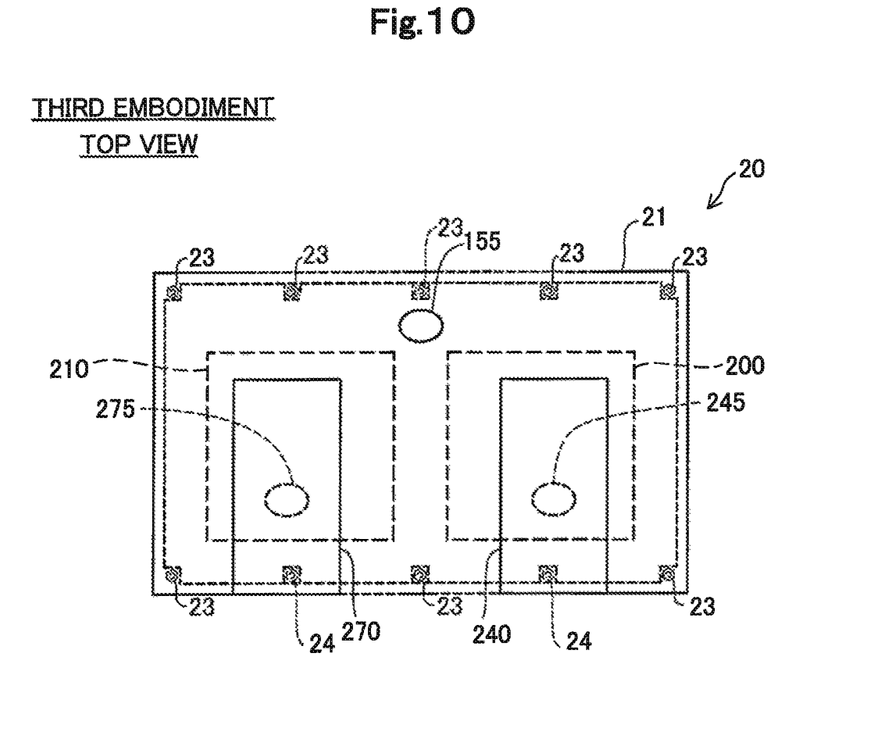
FIG. 10 is a top view of the first high voltage module according to the third embodiment.

FIG. 9 is a front view of the first high voltage module 20 according to the third embodiment. FIG. 10 is a top view of the first high voltage module 20 according to the third embodiment. In the third embodiment, since the wiring for fuel gas pump driving 242 is not provided, the fuel gas pump 220 has the connector 240 for connection to the receptacle 245. Therefore, the gap between the fuel gas pump 220 and the first high voltage module 20 is small, and the bolt 24 is hidden by the fuel gas pump 220. Accordingly, the bolt 24 is not detachable unless the fuel gas pump 220 is detached. Since the wiring for coolant pump driving 272 is not provided, the coolant pump 250 has the connector 270 for connection to the receptacle 275. Accordingly, the bolt 24 is not detachable unless the coolant pump 250 is detached.

In the third embodiment, when the fuel gas pump 220 is detached, the connector 240 is detached from the receptacle 245 and thus the switch 245s is turned off. Accordingly, also in the third embodiment, the lid 22 is opened only after the connector 240 of the fuel gas pump 220 which is the second high voltage component is detached. In order that the lid 22 is opened, the connector 240 of the fuel gas pump 220 which is the second high voltage component is necessarily detached from the receptacle 245. At this time, since the relay 160 is turned off and the supply of high voltage from a supply source is cut off, high voltage is no longer supplied to an inverter for fuel gas pump 200 which is the first high voltage component. As a result, there is no need to additionally provide an interlock mechanism to the inverter for fuel gas pump 200. That is, the number of components is enabled to be reduced compared to the case where an interlock mechanism is additionally provided to the inverter for fuel gas pump 200 which is the first high voltage component. The same applies to the case where the coolant pump 250 hides the bolt 24. It is noted that at least one of the fuel gas pump 220 and the coolant pump 250 may hide the bolt 24.

According to the third embodiment, since the fuel gas pump 220 or the coolant pump 250 hides the bolt 24, the shapes of the connector 155, the connectors 240 and 270 and the arrangement positions of the receptacle 255 and the receptacles 245 and 275 are less limited.

Other Embodiments

Figure 11:
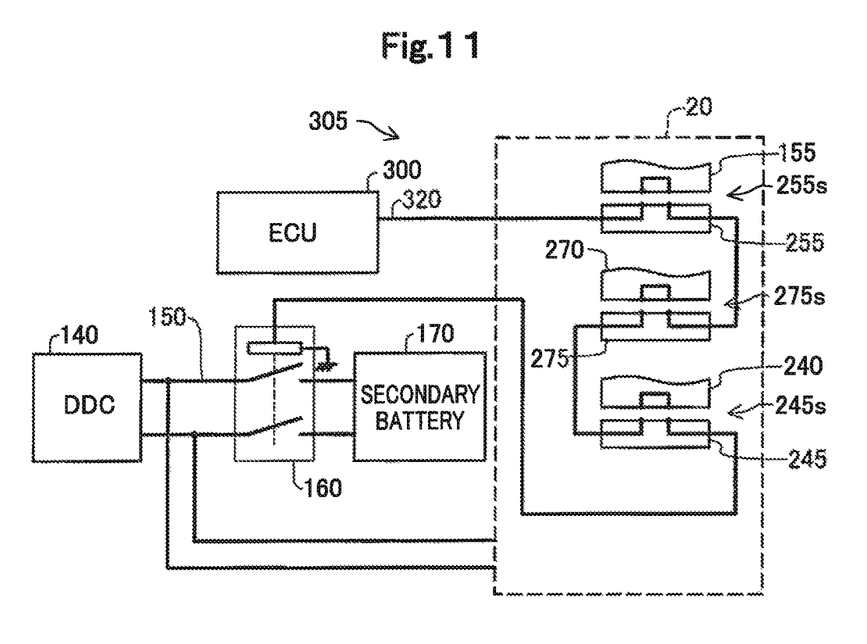
FIG. 11 shows a modification of a cutoff device.

FIG. 11 shows other embodiment of the cutoff device 305. The cutoff device 305 used in the first, second and third embodiments adopts such a system in which the control unit 300 detects the potential of the node N1 of the first control line 310 different from the relay control line 320. A first modification is different in that three switches of the switch 255s, the switch 245s, and the switch 275s are provided on the relay control line 320 between the control unit 300 and the relay 160. The relay 160 according to the first modification is a normally-off relay which is in an off state when not energized and is in an on state when energized. Therefore, when all of the three switches 255s, 245s, 275s are each in an on state, that is, when the connector 155, the connector 240 and the connector 270 are respectively inserted into the receptacle 255, the receptacle 245 and the receptacle 275, the relay 160 is turned on. When any one of the three switches 255s, 245s, 275s is in an off state, that is, when any one of the connectors 155, 240, 270 is detached from the corresponding one of the receptacles 255, 245, 275, the relay 160 is turned off (cut off). According to the first modification, since the potential of a node N1 is not detected, the first modification is resistant to noise. Even if a malfunction occurs in the detection of the potential of the node N1 by the control unit 300, when any one of the three switches 255s, 245s, 275s is in an off state, the relay 160 is enabled to be surely turned off.

In order to provide such a configuration where a fastening member of the second high voltage component is not released, a fastening member for fastening a lid 22 may be provided at a position where the fastening member overlaps the second high voltage component in a top view. Alternatively, in an example, the flange 155f of the connector 155 may have an opening in a size which is larger than that of the bolt 24 but does not allow the insertion of a tool for detaching the bolt 24. Accordingly, the bolt 24 is not detachable unless the connector 155 is detached, once the bolt 24 is inserted into the opening. In this case, the bolt 24 is visible through the opening of the connector 155. The same applies to the case where a substrate 25 prevents the bolt from being detached. It is noted that a case body 21 may be configured to include a lid 22 on the side surface thereof, not on the upper surface.

In the first embodiment, the receptacles 255, 245 and 275 are provided on the lid 22. In the case where the connectors 155, 240 and 270 are formed so as to hide the bolt 24, some or all of the receptacles 255, 245 and 275 may be provided on the case body 21.

In the description above, the power supply system for vehicle 10 is a power supply system for vehicle for use in a vehicle for use in a moving body which includes the driving motor 190. Alternatively, a power supply system for vehicle 10 may be a power supply system for use at home other than for use in a vehicle.

The high voltage component assembly according to the present embodiment is available in a moving body including a high voltage battery, for example, a fuel cell vehicle, an electric vehicle, a hybrid vehicle, and a gasoline vehicle, a diesel vehicle, a mild hybrid vehicle and the like that are equipped with a 48 volt battery.

The present disclosure is not limited to the above-described embodiments or the modification, and is enabled to be realized in various configurations without departing from the spirit of the present disclosure. In an example, in order to solve some or all of the problems described above, or in order to achieve some or all of the effects described above, technical features in the embodiments and the modification corresponding to technical features in each aspect described in Summary of disclosure allow to be replaced or combined as appropriate. Moreover, unless the technical features are described as essential elements in the present specification, the technical features allow to be deleted as appropriate.

The present disclosure is enabled to be realized as the following aspects.

According to one aspect of the present disclosure, a high voltage component assembly is provided. The high voltage component assembly includes a first high voltage component and a second high voltage component for operating respectively upon reception of high voltage from a supply source, a case body for containing the first high voltage component therein, a lid to be attached to the case body to prevent access to an inside of the case body in a state of the lid being attached to the case body, a fastening member to be fastened in a fastening state to fix the lid so as not to be detached from the case body, a receptacle to which the second high voltage component is attached, the receptacle being provided at a position precluding release of the fastening member from the fastening state in a state of the receptacle receiving the second high voltage component attached, and a cutoff device for cutting off the supply of the high voltage from the supply source upon detachment of the second high voltage component from the receptacle.

In order that the first high voltage component is detached, the second high voltage component is detached from the receptacle, and then the fastening member of the case body is detached and the lid is opened. According to the present aspect, the lid of the case body cannot be opened unless the second high voltage component is detached from the receptacle. In order that the lid is opened, the second high voltage component is necessarily detached from the receptacle. When the second high voltage component is detached from the receptacle, the cutoff device cuts off the supply of the high voltage from the supply source, and thus high voltage is no longer supplied to the high voltage component assembly. As a result, there is no need to provide an interlock mechanism in the first high voltage component. That is, the number of components is enabled to be reduced compared to the case where an interlock mechanism is additionally provided to the first high voltage component.

In the above-described aspect, the first high voltage component may include an inverter to be connected to the receptacle, and the second high voltage component may include a connector to be connected to the receptacle to supply the high voltage.

According to the present aspect, the lid of the case body having the inverter cannot be opened unless the connector is detached from the receptacle. In order that the lid is opened, the connector is necessarily detached from the receptacle. When the connector is detached from the receptacle, the supply of the high voltage from the supply source is cut off, and thus the high voltage is no longer supplied to the inverter. As a result, there is no need to provide an interlock mechanism in the inverter. That is, the number of components is enabled to be reduced compared to the case where an interlock mechanism is additionally provided to the inverter.

In the above-described aspect, the second high voltage component in a state of being attached to the receptacle may hide the fastening member.

According to the present aspect, since the second high voltage component in a state of being attached to the receptacle hides the fastening member, the shape of the connector and the arrangement position of the receptacle are less limited.

In the above-described aspect, the cutoff device may include a switch for operating a relay having a contact so as to open the relay at the contact when the second high voltage component is detached from the receptacle, and the contact is provided on a wiring connecting from the supply source of the high voltage to each of the first high voltage component and the second high voltage component.

According to the present aspect, when the second high voltage component is detached from the receptacle, the cutoff device is capable of opening the relay by control so as to stop power supply to the high voltage component assembly.

The present disclosure is enabled to be realized in various aspects, for example, a high voltage component assembly, and moreover in various aspects such as an interlock mechanism, and a power supply system for vehicle.

What is claimed is:

1. A high voltage component assembly comprising:
   a first high voltage component and a second high voltage component for operating respectively upon reception of high voltage supply from a supply source;
   a case body for containing the first high voltage component therein;
   a lid to be attached to the case body to prevent access to an inside of the case body in a state of the lid being attached to the case body;
   a fastening member to be fastened in a fastening state to fix the lid so as not to be detached from the case body;
   a receptacle to which the second high voltage component is attached, the receptacle being provided at a position precluding release of the fastening member from the fastening state in a state of the second high voltage component being attached to the receptacle; and
   a cutoff device for cutting off supply of the high voltage from the supply source upon detachment of the second high voltage component from the receptacle,
   wherein the second high voltage component in a state of being attached to the receptacle hides the fastening member.

2. The high voltage component assembly according to claim 1, wherein
   the first high voltage component includes an inverter to be connected to the receptacle, and
   the second high voltage component includes a connector to be connected to the receptacle to supply the high voltage.

3. The high voltage component assembly according to claim 2, wherein
   the cutoff device includes a switch for operating a relay provided with a contact so as to open the relay at the contact when the second high voltage component is detached from the receptacle, the contact being provided on a wiring connecting from the supply source of the high voltage to each of the first high voltage component and the second high voltage component.

4. The high voltage component assembly according to claim 1, wherein
   the cutoff device includes a switch for operating a relay provided with a contact so as to open the relay at the contact when the second high voltage component is detached from the receptacle, the contact being provided on a wiring connecting from the supply source of the high voltage to each of the first high voltage component and the second high voltage component.

5. A power supply system for vehicle, comprising:
   a supply source including one of a fuel cell and a battery; and
   a high voltage component assembly comprising:
     a first high voltage component and a second high voltage component for operating respectively upon reception of high voltage supply from the supply source,
     a case body for containing the first high voltage component therein;
     a lid to be attached to the case body to prevent access to an inside of the case body in a state of the lid being attached to the case body;
     a fastening member to be fastened in a fastening state to fix the lid so as not to be detached from the case body,
     a receptacle to which the second high voltage component is attached, the receptacle being provided at a position precluding release of the fastening member from the fastening state in a state of the second high voltage component being attached to the receptacle, and
     a cutoff device for cutting off supply of the high voltage from the supply source upon detachment of the second high voltage component from the receptacle, wherein
   the second high voltage component in a state of being attached to the receptacle hides the fastening member,
   the first high voltage component includes an inverter, and
   the second high voltage component includes a cable for supplying power from the supply source to the first high voltage component, and a connector to be connected to the receptacle.

* * * * *